(12) United States Patent
Dodd

(10) Patent No.: US 6,923,022 B1
(45) Date of Patent: Aug. 2, 2005

(54) DUAL-STAGE BLOWHEAD ASSEMBLY

(75) Inventor: Mark P. Dodd, Sylvania, OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 499 days.

(21) Appl. No.: 10/103,594

(22) Filed: Mar. 20, 2002

(51) Int. Cl.[7] .............................................. C03B 9/325
(52) U.S. Cl. .............................. 65/262; 65/300; 65/301
(58) Field of Search ........................... 65/262, 300, 301

(56) References Cited

U.S. PATENT DOCUMENTS

| | | | | | |
|---|---|---|---|---|---|
| 2,123,145 | A | * | 7/1938 | Peiler | 65/262 |
| 2,288,012 | A | * | 6/1942 | Mongan, Jr. | 239/437 |
| 2,309,290 | A | | 1/1943 | Aksomitas | |
| 2,321,555 | A | * | 6/1943 | Mongan, Jr. | 239/264 |
| 2,365,138 | A | * | 12/1944 | Mongan, Jr. | 65/114 |
| 2,386,455 | A | * | 10/1945 | Green | 65/114 |
| 2,390,910 | A | * | 12/1945 | Aksomitas | 65/114 |
| 2,442,315 | A | * | 5/1948 | Samuelson et al. | 65/262 |
| 2,470,228 | A | * | 5/1949 | Aksomitas | 65/348 |
| 2,470,245 | A | * | 5/1949 | Green | 65/115 |
| 2,492,216 | A | * | 12/1949 | Green | 65/115 |
| 2,563,130 | A | * | 8/1951 | Mylchreest | 65/348 |
| 2,613,480 | A | * | 10/1952 | Mongan, Jr. | 65/349 |
| 2,627,702 | A | * | 2/1953 | Lowe | 65/262 |
| 3,652,253 | A | * | 3/1972 | Small | 65/184 |
| 4,526,602 | A | | 7/1985 | Pavlovi | |
| 4,556,405 | A | * | 12/1985 | Luna | 65/82 |
| 4,652,292 | A | * | 3/1987 | Ziegler et al. | 65/84 |
| 4,678,494 | A | | 7/1987 | Nebelung | |
| 4,726,833 | A | * | 2/1988 | Foster | 65/300 |
| 5,372,623 | A | | 12/1994 | Ueda | |
| 5,807,419 | A | * | 9/1998 | Rodriguez-Wong et al. | 65/229 |
| 6,460,377 | B1 | * | 10/2002 | Connors et al. | 65/158 |
| 6,705,121 | B2 | * | 3/2004 | Mungovan et al. | 65/261 |
| 6,766,664 | B2 | * | 7/2004 | Hyre et al. | 65/260 |
| 6,776,009 | B2 | * | 8/2004 | Hyre et al. | 65/260 |

* cited by examiner

Primary Examiner—Sean Vincent

(57) ABSTRACT

A blowhead assembly for receipt over a parison finish to blow the parison within a blow mold and simultaneously cool the parison finish includes a blowhead body having a first chamber at one end for receipt over the finish of a parison in a blow mold, and at least one passage in the blowhead extending to the chamber from a first inlet for directing cooling air onto the external surface of a parison finish in the chamber. A second chamber in the blowhead body is spaced from the first chamber, and at least one second passage in the blowhead body extends to the second chamber from a second inlet for directing blow air into the second chamber. A first tube extends from the second chamber through the first chamber for receipt within a parison finish in the first chamber to feed blow air from the second chamber into the parison. A second tube extends from an exhaust passage in the blowhead body through the second chamber and through the first tube for receiving exhaust air from the parison. The second tube is coaxial with the first tube and extends beyond the free end of the first tube. The second tube has at least a free end that flares radially outwardly for deflecting blow air from the first tube radially outwardly within the parison.

8 Claims, 2 Drawing Sheets

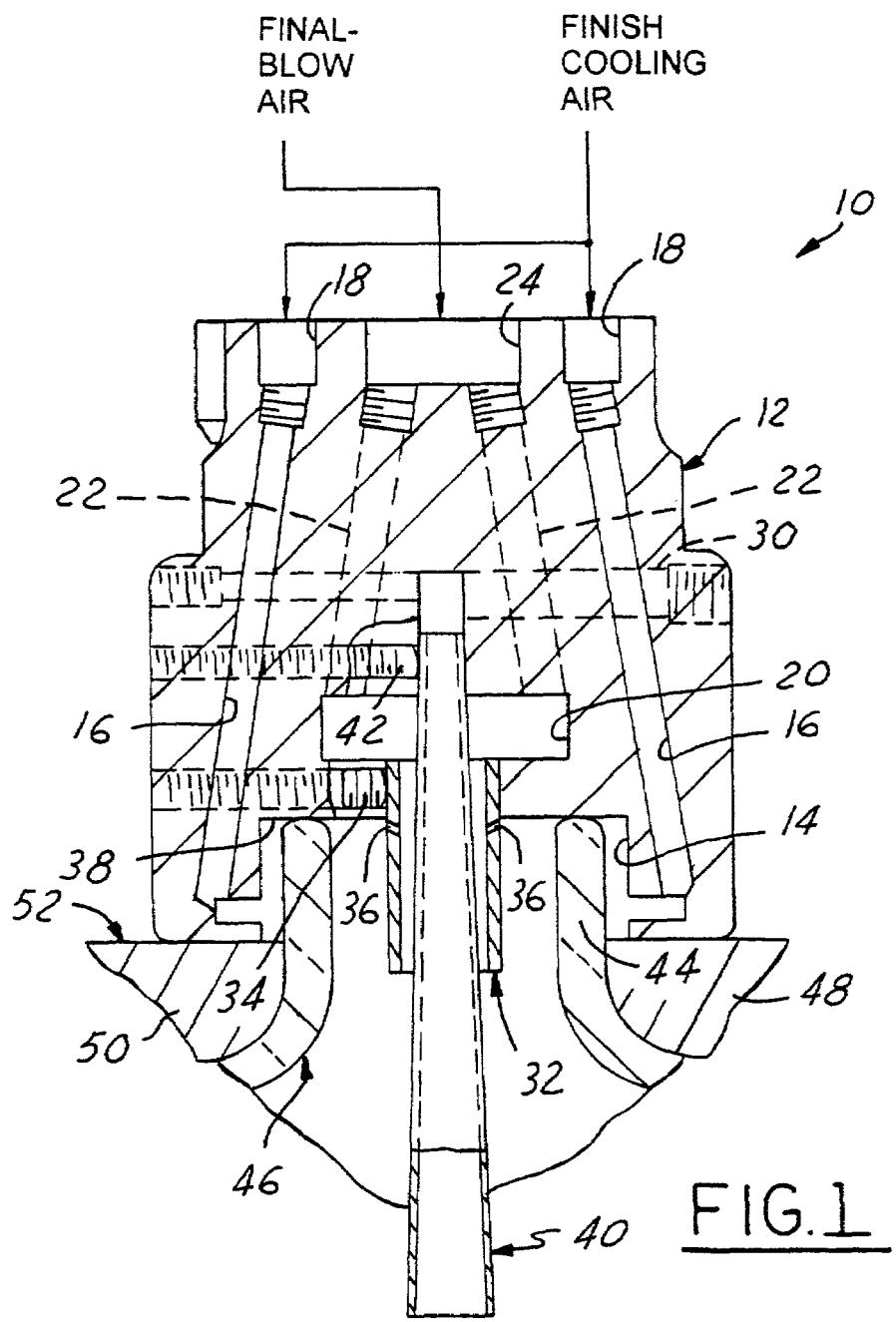
FINAL-BLOW AIR  FINISH COOLING AIR
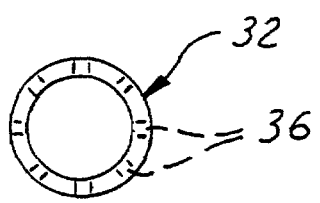
FIG.3
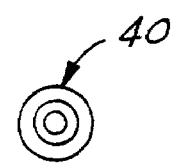
FIG.4
FIG.1

DUAL-STAGE BLOWHEAD ASSEMBLY

The present invention relates to blowheads for blowing articles of glassware in blow molds of a glassware manufacturing machine, and more particularly to a dual-stage blowhead assembly with finish external and internal cooling capability.

BACKGROUND AND SUMMARY OF THE INVENTION

Glassware, such as glass bottles, is typically made in a so-called individual section machine, which includes a plurality of identical sections that operate out of phase with each other to produce the glassware. Each section includes one or more blank or parison molds, in which gobs of molten glass are either pressed or blown to form blanks or parisons. Each parison is then removed from the blank mold and placed in a final-blow mold. A blowhead is lowered over the parison in the blow mold, and final-blow air is directed into the parison through the blowhead to form the parison against the internal surface of the final-blow mold. The blown articles of glassware are then removed from the molds.

Conventional blowheads include an air passage for feeding final-blow air from an inlet to the inside of the parison. One or more second passages branch from the first passage for feeding air around the outside surface of the preformed parison finish to cool the finish and support the finish against outward expansion during the blowing operation. Blowheads of this character have the drawback that the ratio of final-blow air to finish cooling air is determined by the ratio of the diameters of the air passages in the blowhead, as well as other fixed factors. Since the finish cooling air passages branch from the final-blow air passage within the blowhead, it is not possible to vary the ratio of the finish cooling air to the final blow air. It has therefore been proposed to provide a so-called dual-stage blowhead, also sometimes called an isolated finish blowhead, in which the finish cooling air passages are separate from the final-blow air passages and are provided with a separate inlet on the blowhead. The ratio of final-blow air to finish cooling air can be controlled and varied by feeding air at different flow rates and pressures to the final-blow and finish cooling inlets on the blowhead. It is a general object of the present invention to provide improvements in blowhead assemblies, preferably but not necessarily dual-stage blowhead assemblies, in which final-blow air is directed into the parison from directions that achieve improved results in the final blown product.

A blowhead assembly in accordance with a first aspect of the present invention, for receipt over a parison finish to blow the parison within a blow mold and simultaneously cool the parison finish, includes a blowhead body having a first chamber at one end for receipt over the finish of a parison in a blow mold, and at least one passage in the blowhead extending to the chamber from a first inlet for directing cooling air onto the external surface of a parison finish in the chamber. A second chamber in the blowhead body is spaced from the first chamber, and at least one second passage in the blowhead body extends to the second chamber from a second inlet for directing blow air into the second chamber. A first tube extends from the second chamber through the first chamber for receipt within a parison finish in the first chamber to feed blow air from the second chamber into the parison. A second tube extends from an exhaust passage in the blowhead body through the second chamber and through the first tube for receiving exhaust air from the parison. The second tube is coaxial with the first tube and extends beyond the free end of the first tube. The second tube has at least a free end that flares radially outwardly for deflecting blow air from the first tube radially outwardly within the parison.

A blowhead assembly in accordance with a second aspect of the present invention, for receipt over a parison finish in a glassware forming mold to blow the parison within the mold, includes a blowhead body having a passage for receiving blow air and a tube extending from the passage for receipt within the parison finish. The tube has open ends for directing blow air into the parison and radial passages for directing air against the internal surface of the parison finish. These radial passages preferably are disposed and angled to direct blow air against the finish where the finish abuts the opposing surface of the blowhead to help heal any plunger scar and prevent formation of a wire edge around the inside diameter of the finish mouth. This second aspect of the invention may be implemented in dual-stage blowheads in combination with the first aspect of the invention, or may be implemented in other types of blowheads.

BRIEF DESCRIPTION OF THE DRAWINGS

The invention, together with additional objects, features and advantages thereof, will be best understood from the following description, the appended claims and the accompanying drawings in which:

FIG. 1 is a sectional view of a blowhead assembly in accordance with a presently preferred embodiment of the invention received over the finish of a parison in a blow mold;

FIGS. 3 and 4 are respective top plan views of the outer and inner tubes in the blowhead assembly of FIGS. 1 and 2.

DETAILED DESCRIPTION OF PREFERRED EMBODIMENTS

Figure 2:
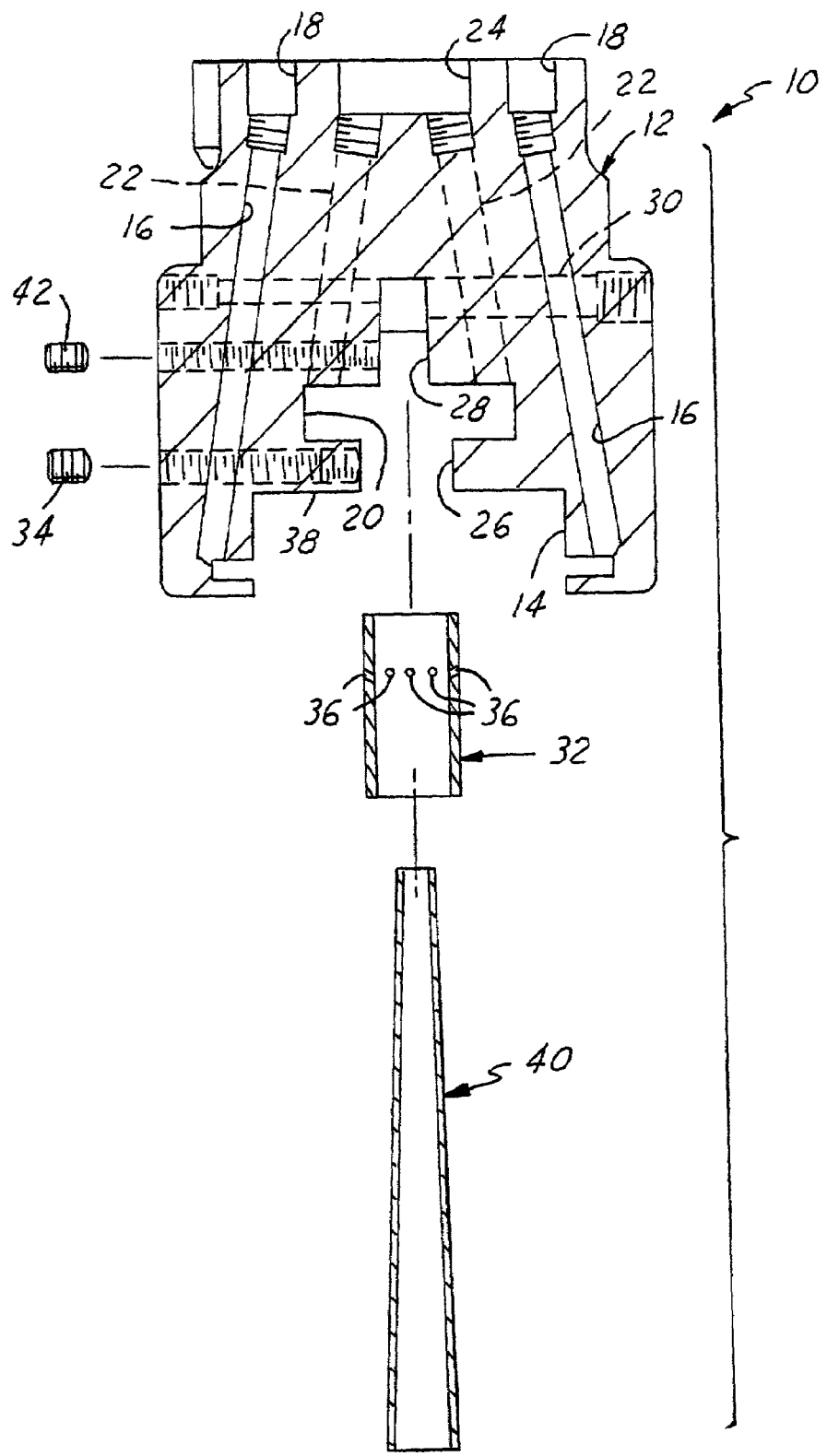
FIG. 2 is an exploded sectioned elevational view of the blowhead assembly illustrated in FIG. 1.

FIGS. 1 and 2 illustrate a dual-stage blowhead assembly 10, sometimes referred to as an isolated finish blowhead assembly, in accordance with one presently preferred embodiment of the invention. Blowhead assembly 10 includes a blowhead body 12 having a first chamber 14 that opens at one end of the blowhead body. At least one first passage 16, and preferably a plurality of first passages 16 extend to chamber 14 from a first inlet 18 at the opposing end of body 12. Passages 16 are disposed in a circumferential array around the central axis of body 12. A second chamber 20 is disposed within body 12 at a position axially spaced from and preferably coaxial with chamber 14. At least one second passage 22, and preferably a circumferential array of second passages 22 extend to the periphery of chamber 20 from a second inlet 24 at the opposing end of the blowhead body. A cylindrical passage 26 extends coaxially from chamber 20 to chamber 14. A passage 28 extends from the opposing or inner end of chamber 20 to intersect a radial exhaust passage 30 within body 12. The portion of passage 28 that intersects chamber 20 is of conical geometry for purposes to be described, while the portion of passage 28 that intersects exhaust passage 30 is either conical or cylindrical. Chambers 14, 20 preferably are cylindrical and coaxial with each other.

A first tube 32 is received within passage 26 of body 12 and secured in the passage by a setscrew 34. Tube 32 is cylindrical in geometry, having an open upper end that opens into chamber 20, and an open lower end that extends through chamber 14. A circumferential array of radial passages 36 extend through the sidewall of tube 32. In assembly (FIG. 1), passages 36 are disposed adjacent to but axially spaced from the flat axially facing upper surface 38 of chamber 14. Openings 36 preferably are angulated toward surface 38 in assembly, most preferably at an angle of around 60° to the axis of the tube and the blowhead. A second tube 40 extends in assembly through tube 32 into passage 28 of blowhead body 12. Tube 40 is of conical geometry, having a narrow upper end received and secured by a setscrew 42 within the conical portion of passage 28. The lower end 42 of tube 40, having a greater diameter, extends through tube 32 and is axially spaced in assembly from the open lower end of tube 32. (Direction words such as "upper" and "lower" are used by way of description and not limitation with respect to the orientation of the blowhead assembly illustrated in FIGS. 1 and 2. Directional words such as "lateral" and "radial" are used by way of description and not limitation with respect to the central axes of tubes 32, 40, which preferably are concentric with each other and with chambers 14, 20 in blowhead body 12.) By way of example, in one embodiment of the invention, tube 32 is 0.88 inches long, and tube 40 is 2.75 inches long having a taper angle of 1.78°. There are eight passages 36 at equal angular increments around tube 32.

FIG. 1 illustrates blowhead assembly 10 received over the finish 44 of a parison 46 placed within the sections 48, 50 of a glassware blow mold 52. Finish 14 is conventionally formed to final geometry at the blank or parison mold stage, while the body of parison 46 is blown to the confines of mold 52 at the final-blow stage, as previously described. Finish cooling air is fed through inlets 18 and passages 16 to the periphery of chamber 14, and thence around the outside diameter of finish 14 in blowhead assembly 12. At the same time, final-blow air is fed through inlet 26, passages 22, chamber 20 and tube 32 to the inside of the parison. This final-blow air is partially deflected radially outwardly by the conical geometry of tube 40. This directs the blow air toward the inside of what will become the container neck and shoulder portions, which help prevent so-called slug necks in the final container. At the same time, a portion of the final-blow air flows through passages 36 adjacent to surface 28 of blowhead body 12. Surface 28 is in end-wise abutment with the sealing surface of container finish 44. Passages 36 are disposed and angulated to direct the air onto the inside surface of the container finish immediately adjacent to surface 38. This helps heal any plunger scars that may have been formed during the parison molding operation, and helps prevent formation of a wire edge around the inside diameter of the container mouth. Excess blow air is exhausted through the inside of tube 40, and through passages 28, 30 in blowhead body 12.

There has thus been disclosed a blowhead assembly that fully satisfies all objects and aims previously set forth. The invention has been disclosed in conjunction with one presently preferred embodiment thereof, and a number of modifications and variations have been discussed. Other modifications and variations will readily suggest themselves to persons of ordinary skill in the art. The invention is intended to embrace all such modifications and variations as fall within the spirit and broad scope of the appended claims.

What is claimed is:

1. A blowhead assembly for receipt over a parison finish to blow the parison within a blow mold and simultaneously cool the parison finish, which comprises:

a blowhead body that includes:
 a first chamber at one end for receipt over the finish of a parison in a blow mold,
 at least one first passage in said blowhead extending from a first inlet to said chamber for directing cooling air onto the external surface of a parison finish in said chamber,
 a second chamber in said blowhead body spaced from said first chamber,
 at least one second passage in said blowhead body extending from a second inlet to said second chamber for directing blow air into said second chamber, and
 an exhaust passage in the blowhead body,
 a first tube extending from said second chamber through said first chamber for receipt within a parison finish in said first chamber for feeding blow air from said second chamber into the parison, and
 a second tube extending from said exhaust passage through said second chamber and through said first tube for receiving exhaust air from within the parison,
 said second tube being coaxial with said first tube, said second tube extending beyond a free end of said first tube, and said second tube having at least a free end that flares radially outwardly for deflecting blow air from said first tube radially outwardly within the parison.

2. The blowhead assembly set forth in claim 1 wherein said second tube is conical.

3. The blowhead assembly set forth in claim 1 wherein said first tube has radial openings within said first chamber for directing blow air radially outwardly against a parison finish in said first chamber.

4. The blowhead assembly set forth in claim 3 wherein said first chamber has an axially facing surface for abutment with the parison finish, and wherein said radial openings are disposed adjacent to said surface.

5. The blowhead assembly set forth in claim 4 wherein said radial openings are angled toward said surface.

6. The blowhead assembly set forth in claim 5 wherein said first tube is cylindrical, and wherein said radial openings are at a 60° angle to the axis of said cylindrical first tube.

7. A blowhead assembly for receipt over the finish of a parison in a blow mold of a glassware forming machine to blow the parison within the blow mold and simultaneously cool the parison finish, which comprises:

a blowhead body that includes:
 a first chamber at one end for receipt over the parison finish and having a surface for end abutment with the parison finish,
 at least one first passage extending from a first inlet to a periphery of said first chamber for directing cooling air onto the external surface of a parison finish within said body in said first chamber,
 a second chamber spaced from said first chamber,
 at least one second passage in said blowhead extending from a second inlet to said second chamber for directing blow air into said second chamber, and
 an exhaust passage in said blowhead body,
 a cylindrical first tube extending from said second chamber through said first chamber for receipt within a parison finish in said first chamber for feeding blow air from said second chamber into the parison, said first tube having open ends and radial openings adjacent to said surface of said first chamber for directing blow air into the internal surface of a parison finish in said first chamber, and a second tube extending from said exhaust passage through said second chamber and through said first tube for receiving exhaust air from within the parison, said second tube being conical having a narrow end recessed in said blowhead body in communication with said exhaust passage, a mid portion extending through said first tube coaxially with said first tube, and a wide end spaced from a free end of said first tube for deflecting blow air from said first tube radially outwardly within the parison.

8. The blowhead assembly set forth in claim 7 wherein said radial openings in said first tube are angled toward said surface.

* * * * *